US006382424B1

(12) United States Patent
Bolton et al.

(10) Patent No.: US 6,382,424 B1
(45) Date of Patent: May 7, 2002

(54) PORTABLE SCREENING DEVICE AND METHOD

(76) Inventors: Christopher J. Bolton, 173n S. Stark Hwy.; Kenneth A White, PO Box 224, both of Weare, NH (US) 03281

( * ) Notice: Subject to any disclaimer, the term of this patent is extended or adjusted under 35 U.S.C. 154(b) by 0 days.

(21) Appl. No.: 09/824,982

(22) Filed: Apr. 3, 2001

(51) Int. Cl.[7] .............................. B07B 1/46; F16F 1/12

(52) U.S. Cl. ....................... 209/405; 209/397; 209/399; 209/366.5; 209/420; 267/179

(58) Field of Search ............................ 209/366.5, 421, 209/420, 414, 405, 399, 397; 267/179, 229, 36.1, 47, 158

(56) References Cited

U.S. PATENT DOCUMENTS 311,485 A * 2/1885 Johnson
1,081,393 A * 12/1913 Lobdell
1,424,451 A * 8/1922 Crandall
1,510,742 A * 10/1924 Gutleben
2,378,499 A * 6/1945 Rapp .......................... 209/415
3,909,401 A * 9/1975 Thompson .................. 209/412
4,256,572 A * 3/1981 Read .......................... 209/257
4,350,584 A * 9/1982 Donington .................. 209/352
4,540,485 A * 9/1985 Lanerie ...................... 209/323
4,552,653 A * 11/1985 Sumino ...................... 209/421
4,582,597 A * 4/1986 Huber ........................ 204/313
5,037,536 A * 8/1991 Koch et al. ................ 209/325
5,248,043 A * 9/1993 Dorn .......................... 209/399
5,294,065 A 3/1994 Harms et al.
5,295,317 A 3/1994 Perrott
5,433,575 A 7/1995 Milstead
5,957,302 A * 9/1999 Douglas ..................... 209/421
6,029,822 A 2/2000 Skoropa

FOREIGN PATENT DOCUMENTS

JP 63116948 A 5/1988
JP 02162129 A * 6/1990
JP 3217280 A 9/1991
JP 5154401 A 6/1993
JP 5154402 A 6/1993
JP 5154403 A 6/1993
JP 5329448 A 12/1993
JP 9085174 A 3/1997
JP 09262495 A * 10/1997

* cited by examiner

*Primary Examiner*—Donald P. Walsh
*Assistant Examiner*—Joseph Rodriguez
(74) *Attorney, Agent, or Firm*—Robert R. Deleault, Esq.; Mesmer & Deleault, PLLC

(57) ABSTRACT

A truck mounted particle screener for mounting atop the dump body of a dump truck having a support frame, a screen deck, a plurality of spring assemblies connecting the screen deck to the support frame, and a vibrating mechanism attached to the screen deck for imparting the vibratory motion to the screen deck.

15 Claims, 9 Drawing Sheets

PORTABLE SCREENING DEVICE AND METHOD

BACKGROUND OF THE INVENTION

1. Field of the Invention

The present invention relates to machines for screening a particulate, granulate or any other material. Particularly, the present invention relates to a screener that is portable and compact enough to be contained and moved on a dump body. More particularly the present invention is a screener compact enough to be mounted over the dump body on a standard dump truck. Even more particularly, the present invention relates to a screener that can support itself independent of the vehicle's support structure or power source.

2. Description of the Prior Art

Particle screeners are useful in the field of construction excavation for separating the components of soil. By using a screener soil can be broken up into its components of different particle size such as topsoil, sand, rocks, and larger organics such as plant matter. Once the components of the soil have been separated the product can be used in its proper application. Currently the only designs available are either so large that it is required that they are towed to location or are built to a specialized truck.

Several portable screeners have been created for particle separation. Current portable screeners are either towed to the site or are fixed to a specialized vehicle dedicated to moving the screener. There have been no devices created for a vehicle mounted portable screener that can also function independently from the mounting vehicle.

U.S. Pat. No. 6,029,822 (Allan Skoropa) discloses a vibratory screening device including a frame and a screen, supported by the frame, for separating undersize and oversize material. A vibratory device, consisting of an eccentric shaft, coupled to the screen that includes a first output shaft with an axis of rotation that oscillates with relation to the frame. The vibratory device oscillates the screen as the first output shaft is rotated. A driver includes a second output shaft with an axis of rotation that includes a second output shaft with an axis of rotation that is fixed relative to the frame. The driver rotates the first output shaft. Preferably, the connector includes a first universal joint, a sliding spine shaft, and a second universal joint. The driver preferably includes an engine, a centrifugal clutch coupled to the first output shaft, a sheave, and an endless belt connecting the centrifugal clutch to the sheave. The disadvantage of this device is that it is not a truck dump-body mounted unit.

U.S. Pat. No. 5,294,065 (Timothy O. Harms) discloses a high rate portable combination screening/dosing/mixing plant that is mounted on a single tractor-trailer for highway travel. The apparatus is used in soil remediation. The invention comprises of an apparatus train for preliminary particle separation, a hopper, a shredder, particle size screener, an apparatus for mixing, and a conveyor belt for elevating product to desired locations. The disadvantage in this apparatus is that it must be towed to the site.

U.S. Pat. No. 5,433,575 (John Milstead) discloses a method of erecting a portable asphalt production plant. The asphalt production plant comprises of upper and lower subassemblies that are attached to a trailer for towing the production plant to the worksite. Once at the worksite the frame is detached from the trailer and the upper subassembly is positioned on top of the lower subassembly. The size of this apparatus dictates that it must be towed to the worksite.

The disadvantages of the currently available screeners are that they require a specialized truck and additional driver to transport them to the excavation sites. This is problematic because in addition to the added costs of obtaining and using the equipment and drivers for transporting the particle screener, the equipment is no longer readily available for performing other tasks. Owners of screeners often own vehicles, i.e. dump trucks, for towing the screeners. The advantage of mounting equipment to a dump body is it allows for the same vehicle to tow additional equipment by trailer thus reducing the number of vehicles and drivers necessary to transport the screener.

Therefore what is needed is a portable screener that can be easily mounted onto and removed from atop the dump body of a dump truck. What is further needed is a dump-body mounted portable screener that is capable of functioning on its own structural supports or legs. What is still further needed is a portable vehicle mounted screener that can function under either its own power source or the power source provided by the vehicle on which it is mounted.

SUMMARY OF THE INVENTION

It is an objective of the present invention to provide a particle screener for removably mounting atop the dump body of a dump truck. It is a further objective of the present invention to provide a portable screener that can be mounted atop the dump body of a dump truck and be capable of functioning on its own structural supports or legs to support the portable screener. It is still a further objective of the present invention that the screener is capable of functioning under either its own power source or a power source provided by the mounting vehicle.

The present invention achieves these and other objectives by providing various structural features that make mounting the particle screener onto a dump body of a dump truck, possible. The vehicle-mounted screener includes a support frame, at least one vibratory screen deck, a plurality of springs, and an agitation/oscillating source. The support frame provides support for the vibratory screen deck and the mechanism for mounting the screener to a dump body. The springs hold the vibratory screen deck to the screener frame and return the screen to its original position during agitation/oscillation. The screen separates the particles by particle size. As used herein "particle" refers to any material, which is primarily non-continuous and largely comprises solid or semisolid pieces. The particulate material referred to may range from uniformly sized grains such as sand to a sill or compost having entities of widely varying sizes and compositions including material of animal, vegetable and mineral origin. Moisture or other liquid may be associated with the solids. The agitation/oscillation source provides motion to the vibratory screen deck.

The support frame of the present invention provides a stationary base for the vibratory screen deck and for supporting the screener atop the dump body of a dump truck. Optionally, the screener may be provided with a mechanism to support the screener when the screener is not mounted atop the dump body of a dump truck. The support frame is constructed from elongated tubing. The tubing may be square, rectangular or circular in cross section. The cross pieces that support the screener over the dump body are pieces of square tubing that are rotated in a manner to create a diamond cross section. This configuration presents angled crosspieces that prevent material from collecting on the crosspieces as the material is screened into the dump body from the vibratory screen deck. The support frame may be described as having a rectangular shape with extending ends from two sides of the rectangular structure. The dimensions of the support frame are compatible and sized to the dump body over which it is to be mounted. The extending ends are used to support the screener atop the dump body of the dump truck.

The frame mounts are configured onto sideboards that are mounted along the sides of the dump body. The extending ends are fitted into the frame mounts for supporting the screener over the dump body allowing the screened material to collect within the dump body. The sideboards have at least four shaped receiving connectors, i.e. frame mounts, for supporting the support frame of the screener. The receiving connectors in the sideboards may be either shaped slots or shaped brackets. The shaped slots are formed by cutting the slots into the sideboards. The shaped brackets are formed by attaching the brackets to the sideboards. The shape of the brackets or slots is compatible with the extending ends of the support frame. The sideboards are fitted to the bed of the vehicle and the screener frame connects to the frame mounts incorporated into the sideboards. A combination of slots and brackets at different heights may be used to tilt the screener or the screener can be mounted parallel to the bed of the vehicle by placing the frame mounts at the same height.

The support frame of the screener also has provisions to support the screener when removed from the dump body. The screener frame may have a set of legs for supporting the screener independent of the dump body. The legs may be pivotally attached, removably attached, or telescopingly attached to the screen frame. The legs are hydraulically, electrically, or mechanically actuated. When the legs are not needed as when the screener is left atop the dump body for use, they may be optionally removed from the screener or positioned in a manner that would not interfere with the use of the screener. Additionally the screener has a hopper that is shaped in a manner to guide the raw material onto the vibratory screen. The hopper may be attached to the screen deck to facilitate loading of raw material and for containing raw material to the screen. Another embodiment of the hopper design is a detachable hopper that mounts to the screener frame by way of hopper supports.

The springs attach the support frame to the vibratory screen deck and return the vibratory screen deck back to its original position during agitation. Leaf springs, coil springs or a combination of springs may be employed. Bumper stops may also be used to help return the vibratory screen deck to its starting position. The springs are mounted from the side of the support frame to the side of the vibratory screen deck. The springs may also be a combination of a coil and leaf type spring. If the combination is used the leaf spring is preferably the main vibratory action spring and the coil spring would provide the return action. A leaf spring setup is quieter than a coil spring setup. The springs position the vibratory deck above the screener frame in a manner that allows the particles to fall through the screener and collect in the dump body of the dump truck.

The vibratory screen deck includes a screen, a screen deck frame, and screen retainers. The screen separates the particles through a mesh size chosen by the user. Six cross-bracing members reinforce the screen deck frame. The cross bracing members are parallel to the shorter ends, or width, of the screen deck. In addition to the cross bracing members, there is screen bracing that supports the screen. The screen bracing is configured such that it causes the screen to have a continuous peak or crown down the entire length of the screen. The continuous crown is positioned parallel to the length of the screen deck. The crown ensures that the particles spread out and do not pool in the center of the vibratory screen during use. Crowning is achieved by positioning the tallest screen bracing down the center of the screen parallel to the length dimension of the screen deck with an array of shorter screen bracing to either side of the center. Rubber tubing for protecting the screen bracing from wear as well as keeping the apparatus quieter may be used to cover the screen bracing and to support the screen.

A screen retainer or bracket is used to attach the screen to the screen deck. The screen bracket is an elongated strip that may be flat or have an L or C shape. The screen is held in place by bolting at least two screen brackets, which run along the longer end or length of the screen deck, to the inside of the screen deck. The screen retainer holds the screen to the screen deck by applying pressure to the edges of screen and compressing the screen against the frame of the screen deck when the retainer is bolted to the sides of the screen deck.

The screen deck also incorporates provisions for attaching more than one vibratory screen deck to the screener. In embodiments where the hopper is not permanently secured to the screen deck, additional screen decks may be attached by bolting or clamping the additional screen deck to the previous screen deck. This enables one to incorporate different mesh sizes to further separate material.

The screener also includes an agitation mechanism. The agitation mechanism includes an elongated housing that encloses a drive motor coupled to a vibratory shaft supported by bearings. The drive motor has power connections for receiving the electrical or hydraulic power required to drive the drive motor. The vibratory shaft may be a cylindrical shaft with an off-center rotational axis, or a rectangular shaft with an off-center rotational axis, or a square shaft with an off-center rotational axis, or a shaped shaft with an attachable counterweight that is attached along the length of the vibratory shaft where the shaped shaft may or may not have an off-center rotational axis. The mechanism also includes a coupling device to couple the vibratory shaft to the drive motor.

The elongated housing contains the drive motor, vibratory shaft and support bearings and protects the working components from the outside weather, screening material and the like, thus extending component life. The elongated housing is attached to the bottom of the screen deck across its width at the screen decks approximate center. The elongated housing conveys the motion produced by the off-balanced, rotating shaft to the screen deck causing the screen deck to vibrate. For maintaining the mechanics within the enclosed housing there is a service cover positioned along the length of the enclosed housing that can be removed to provide access to the vibratory mechanism components for repair and replacement.

The rotating off-balanced shaft is configured to provide an off-balance rotation. To provide a shaft with an off-balanced weight, a steel shaft with a square cross section may be produced with milled ends either off-center with the rotational axis of the shaft or not. In either case, adding more off-center weight to the rotating shaft may be accomplished by tapping bolt holes into one face of the shaft to provide a mechanism for fastening an offset weight to the shaft. The offset weight of the shaft when rotated creates an elliptical motion that causes the vibratory screen deck to move up and down. A second embodiment of the rotating, off-balanced shaft includes a machined steel bar with circular cross-sectional ends in line with the body of the bar, the offset weight provided only by the addition of extra weight of the tapped bolts. A third embodiment of the rotating, off-balanced shaft includes a set of flywheels attached by a shaft offset from the centerline of the flywheels. The offset weight provided by the offset shaft when rotated creates an elliptical motion similar to that created by the bolt heads. The elliptical motion of the vibratory shaft is applied to the elongated housing by a set of bearings coupling the elongated housing to the rotating shaft.

Another variation of the above design is to incorporate two synchronized motors located at each end enclosed within the enclosed housing. A further variation is to incorporate one motor centrally positioned within the enclosed housing driving two offset shafts on either side of the centrally positioned motor. Another variation for providing agitation to the screen is to incorporate a shaft with an exposed offset counter weight. By positioning a counter weight at the end of a shaft and rotating the same effect can be achieved.

In use, the user would mount sideboards having receiving connectors to a vehicle dump body. The user then positions the extending ends of the support frame of the screener into the receiving connectors of the sideboards. The screener is secured to the vehicle by connecting the support frame of the screener to the vehicle frame with tie downs as is well known in the art. At this point, the user may transport the screener to the worksite. For operating the screener while mounted atop the dump body of the vehicle, the user connects a power source to the drive motor of the screener's agitation mechanism. The agitation mechanism can be powered by using the power sources incorporated in the vehicle whether it is an electrical or hydraulic power source. If the user desires to operate the screener independently from the vehicle, the user may erect the screener using the screener's support structure or legs and connect an independent power source to the drive motor of the agitation mechanism. Once the user decides in which configuration he wants to operate the screener, the user starts the drive motor of the screener and adds the raw material into the hopper or directly onto the vibratory screen by using a frontloader or other means to move the raw material.

Additional advantages and embodiments of the present invention will be set forth in part in the detailed description which follows and in part will be apparent from the description which follows or may be learned by practice for the invention. It is understood that the foregoing general description and the following detailed description are exemplary and explanatory and are intended to provide further explanation of the invention as claimed.

BRIEF DESCRIPTION OF THE DRAWINGS

FIG. 4 is a side view of the present invention showing the spring assemblies attached to the support frame and the screen deck.

DETAILED DESCRIPTION OF THE PREFERRED EMBODIMENT

Figure 1:
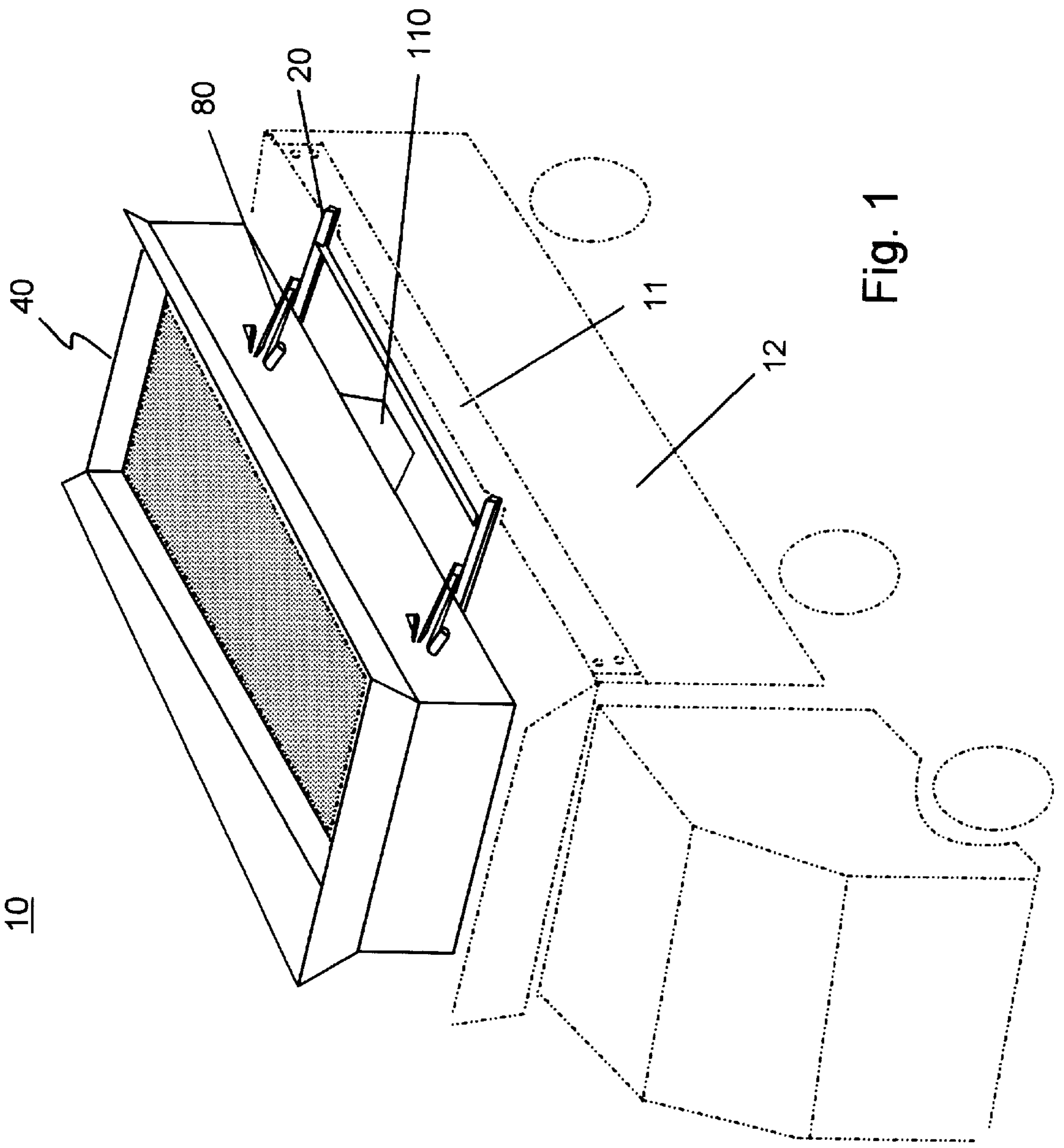
FIG. 1 is a perspective view of the present invention atop a dump truck.

The preferred embodiment of the present invention is illustrated in FIGS. 1–8. FIG. 1 shows a screener 10 mounted to a dump body 12. The screener 10 includes a support frame 20, a vibratory screen deck 40, a plurality of spring assemblies 80, and a vibratory mechanism 110. The screener 10 is supported on the dump body 12 by sideboards 11. Sideboards 11 are secured to dump body 12.

Figure 2:
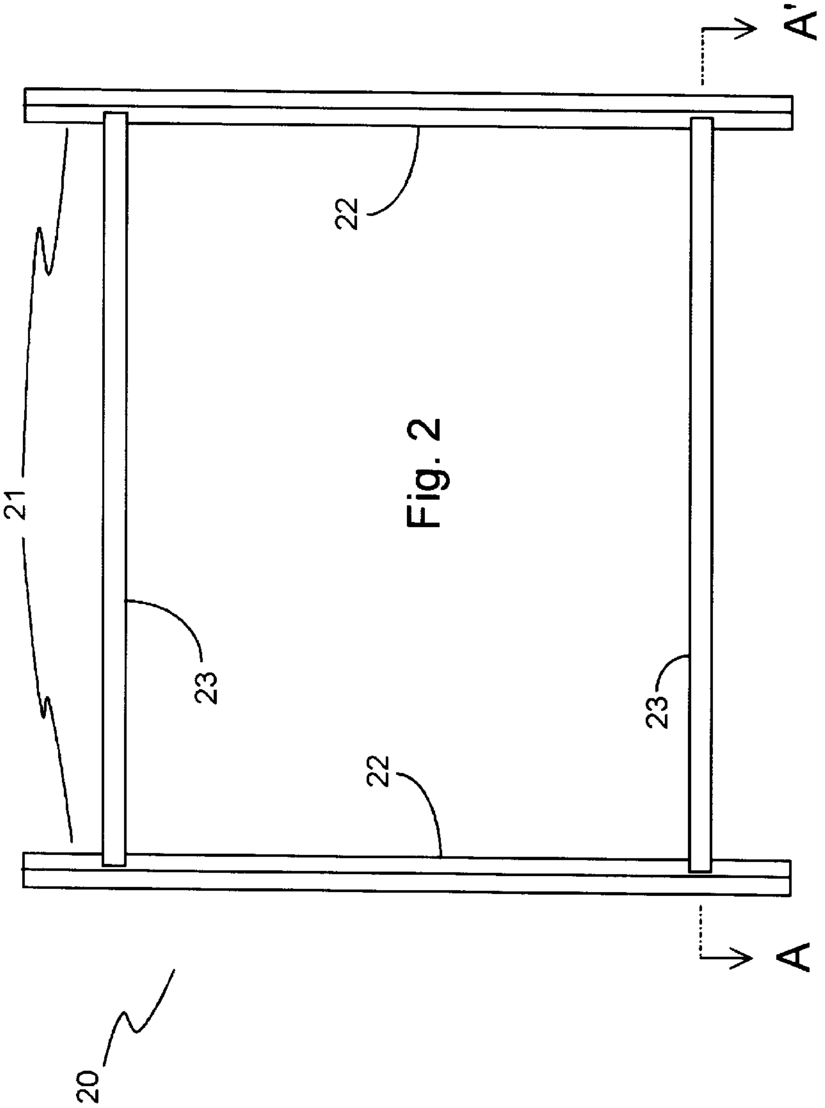
FIG. 2 is top view of the support frame of the present invention.
Figure 2A:
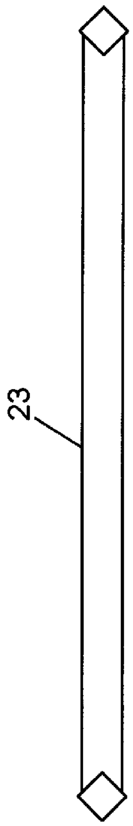
FIG. 2A is a cross-sectional view of the support frame in FIG. 2 taken along A–A'.

FIG. 2 shows a top view of support frame 20 having a rectangular shape and extending ends 21 on two sides of the rectangular shape. Extending ends 21 are used for supporting screener 10 when mounted atop dump body 12. The support frame 20 includes two mounting sides 22 and two connecting sides 23. The two mounting sides 22 of support frame 20 are constructed of 4"×4"×0.375" metal tubing, which is preferably rotated so that their cross section is diamond shaped. The length of the mounting sides 22 of screener frame 20 is sized to span the width of the dump body of a particular dump truck. In this case, the mounting sides are approximately eight feet long. Welded perpendicularly to the mounting sides 22 are connecting sides 23 which are constructed of 2"×5"×¼" metal tubing and are approximately eight feet long. The connecting sides 23 are welded to the mounting sides 22 at a position creating extending ends 21 each having a length of about eleven inches for mounting to sideboards 11. FIG. 2A is a cross-section of screener frame 20 taken at A–A' and shows how connecting sides 23 are notched at their ends to accommodate the diamond cross section of mounting sides 22. The resulting structure of the above components has the dimensions of being approximately 8' wide and 8'4" long. Another embodiment of the present invention would include a set of legs permanently or detachably connected to support frame 20 at the extending ends 21 for supporting screener 10 independent from dump body 12.

Figure 3:
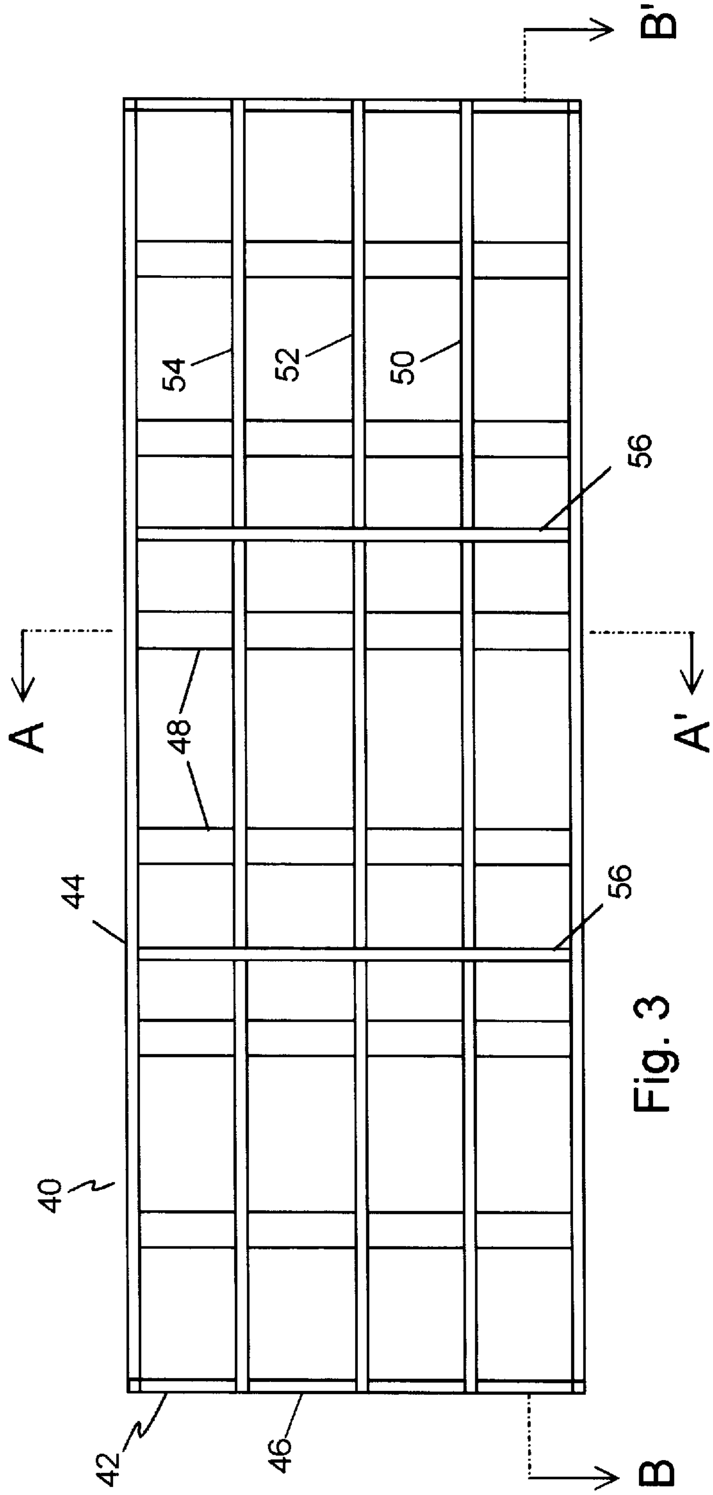
FIG. 3 is a top view of the screen deck of the present invention showing the deck frame, the cross bracing, the screen supports, and the screen flashing.

FIG. 3 is a top view of vibratory screen deck 40. Screen deck 40 has a screen deck frame 42, a screen (not shown), a plurality of cross-bracing members 48, screen supports 50, 52 and 54, screen retainers (not shown), and screen cross-supports 56. The screen deck frame 42 is constructed of front and back end rails 46 and two side rails 44 welded at their ends forming a rectangular structure. End rails 46 are approximately five feet long and the side rails 44 are approximately thirteen feet eight inches long. The end rails 46 and side rails 44 are constructed from 10"×2"×⅝" metal channel. Supporting the screen deck frame 42 is cross bracing members 48, which are preferably structural steel I-beams with the dimensions 3"×2 ½"×¼". Each of the six cross-bracing members 48 is positioned equally from each other. Perpendicular to the cross-bracing members 48 are three screen supports 50, 52 and 54 for supporting the screen. Screen supports 50, 52 and 54 are constructed of flat stock steel, preferably 1¼"×5⁄16" for support 52 and ¾"×5⁄16" for supports 50 and 54, and are welded to cross-bracing members 48 as well as the end rails 46. Screen support 52 is taller than screen supports 50 and 54 and is positioned down the center of screen deck 40. The shorter screen supports 50 and 54 are placed on either side of screen support 52 between screen support 52 and side rail 44 to cause the screen to crown or arch. In addition to the screen supports 50, 52 and 54, there is also screen flashing 56 positioned perpendicular to and over screen supports 50, 52 and 54. Screen flashing 56 is used to support the edge of the three commercially available screens used in the present invention.

Figure 3A:
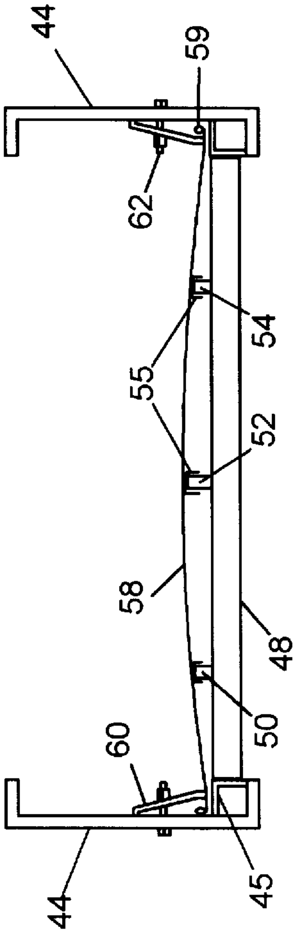
FIG. 3A is a cross-sectional view of the screen deck in FIG. 3 taken along A–A' showing the side rails, screen, screen supports, cross bracing, and screen retainers.

FIG. 3A shows a cross-sectional view of screen deck 40 at A–A'. Along the lower edge of each side rail 44, a piece of angle iron is attached forming a tubing enclosure or flange 45. The angle iron used is preferably 3"×2"×5⁄16". The flange 45 provides a flat surface for supporting the screen 58 within screen deck 40. The screen supports 50, 52 and 54 support the screen in a crowned manner. In the preferred embodiment the tallest screen brace 52, with a height of about 1¼", is secured down the center of screen deck 40. The shorter screen supports 50 and 54, being approximately ¾" in height, are secured on each side of and spaced from screen support 52. Screen supports 50, 52 and 54 are covered with a replaceable rubber tubing 55 for protecting screen supports 50, 52 and 54 from wear and tear and to reduce the noise produced by screen 58 during operation.

A screen retainer 60 attaches the screen 58 to the screen deck 40. Screen retainer 60 holds the screen 58 in place by compressing the screen 58 between the screen retainer 60 and the flange 45. To enhance screen retention, screen 58 may have a thicker portion along its edge forming a lip 59 that prevents screen 58 from slipping underneath screen retainer 60. A plurality of screen retainer bolts 62 secures the screen retainer 60 along its length to side rail 44. The shape of screen retainer 60 can be C-shaped, L-shaped or a flat-panel shape.

Figure 3B:
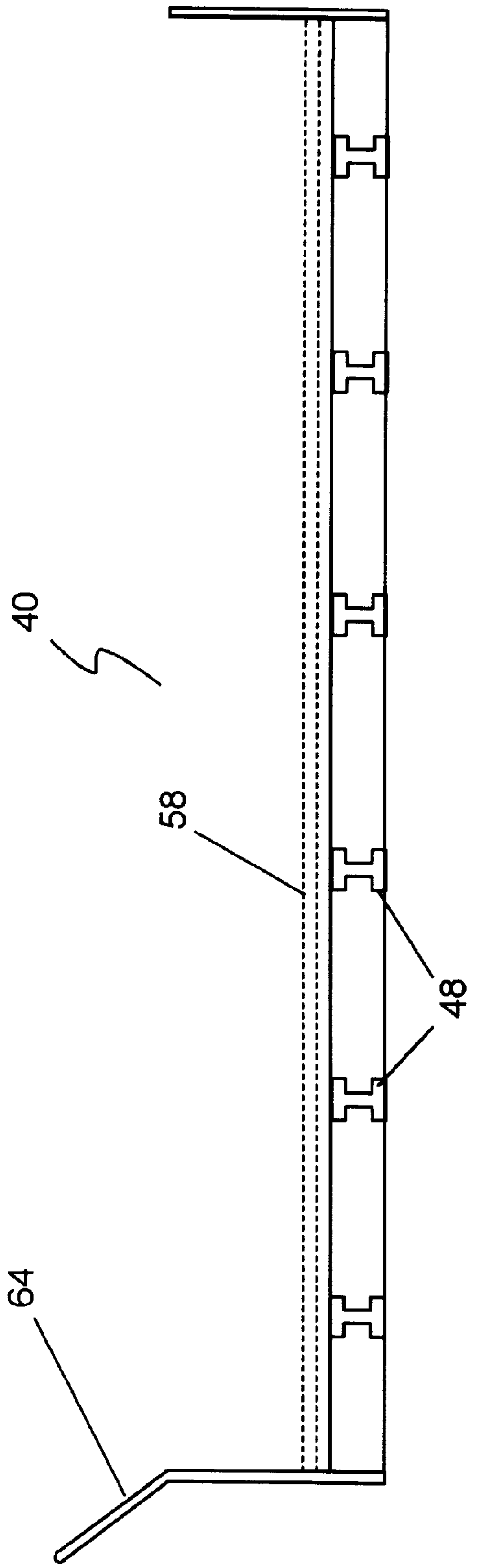
FIG. 3B is a cross-sectional view of the screen deck in FIG. 3 taken along B–B' showing the cross bracing I-beams and a portion of the hopper.

FIG. 3B is a cross-sectional view along B–B' of FIG. 3. The cross-bracing members 48 are more clearly shown having the I-beam shape previously discussed. Also shown is a portion of hopper 64.

FIG. 4 shows a side view of screener 10. Four spring assemblies 80 connect the support frame 20 to the screen deck 40. The spring assemblies 80 include a spring component 90 and a spring stop 82. Spring assemblies 80 position the bottom of the screen deck 40 approximately one foot above the top of the support frame 20. Spring stop 82 provides a stop mechanism that helps prevent screen deck 40 from dropping too low when loaded with raw material to be screened and also helps provide additional spring action to the screen deck 40 during operation. This is accomplished by the biasing action of spring component 90, which will be more fully explained later. A hopper 64, constructed from AR360, is welded to the screen deck 40 along side rails 44 and front end rail 46 for facilitating raw material loading to the screener 10. Below screen deck 40 is located vibratory mechanism 110, which is fastened to screen deck 40 at the side rails 44 using a connecting plate 116 on each side. Connecting plate 116 may include a connecting plate access cover 118 that may be removed for providing access to the protected components of vibratory mechanism 110.

Figure 4A:
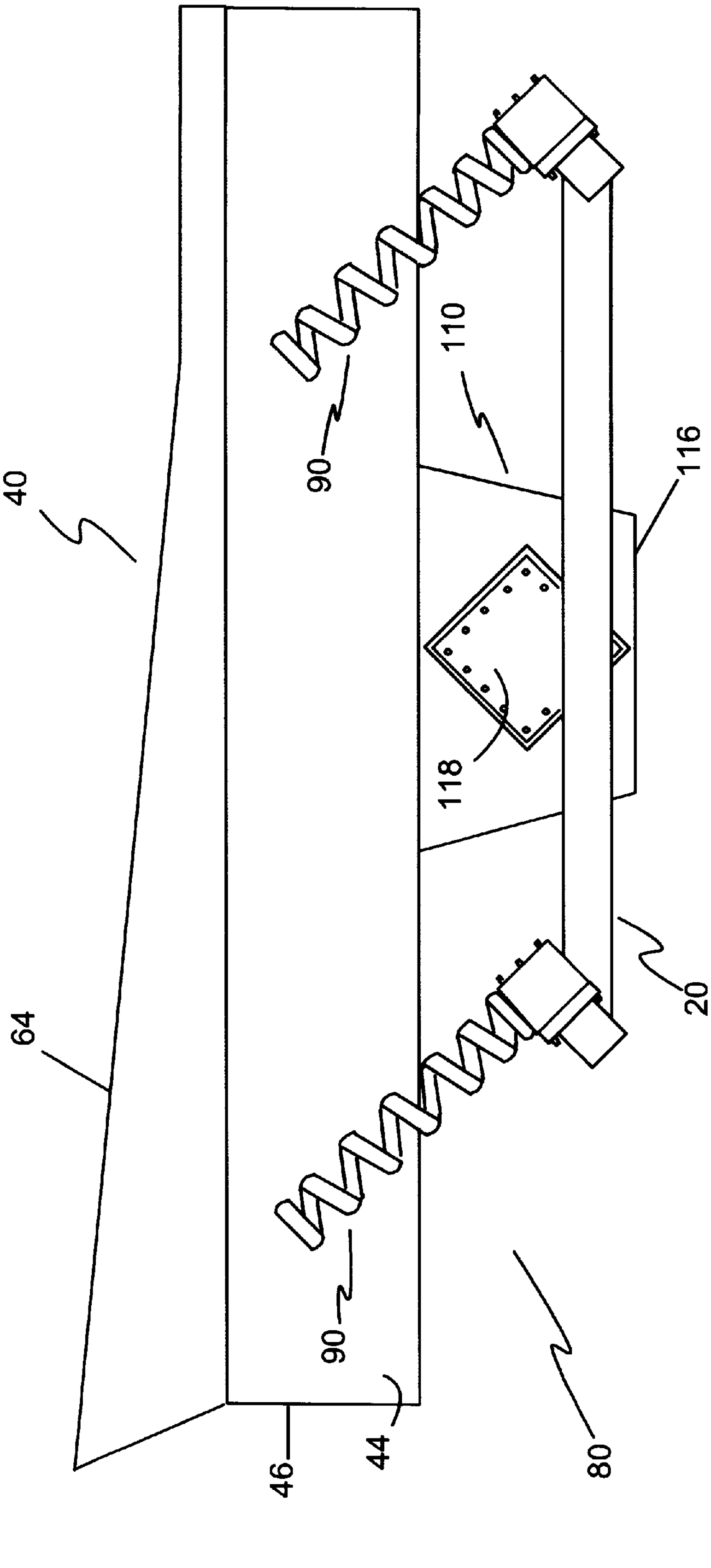
FIG. 4A is a side view of the present invention showing a second embodiment of the spring assemblies attached to the support frame and the screen deck.
Figure 4B:
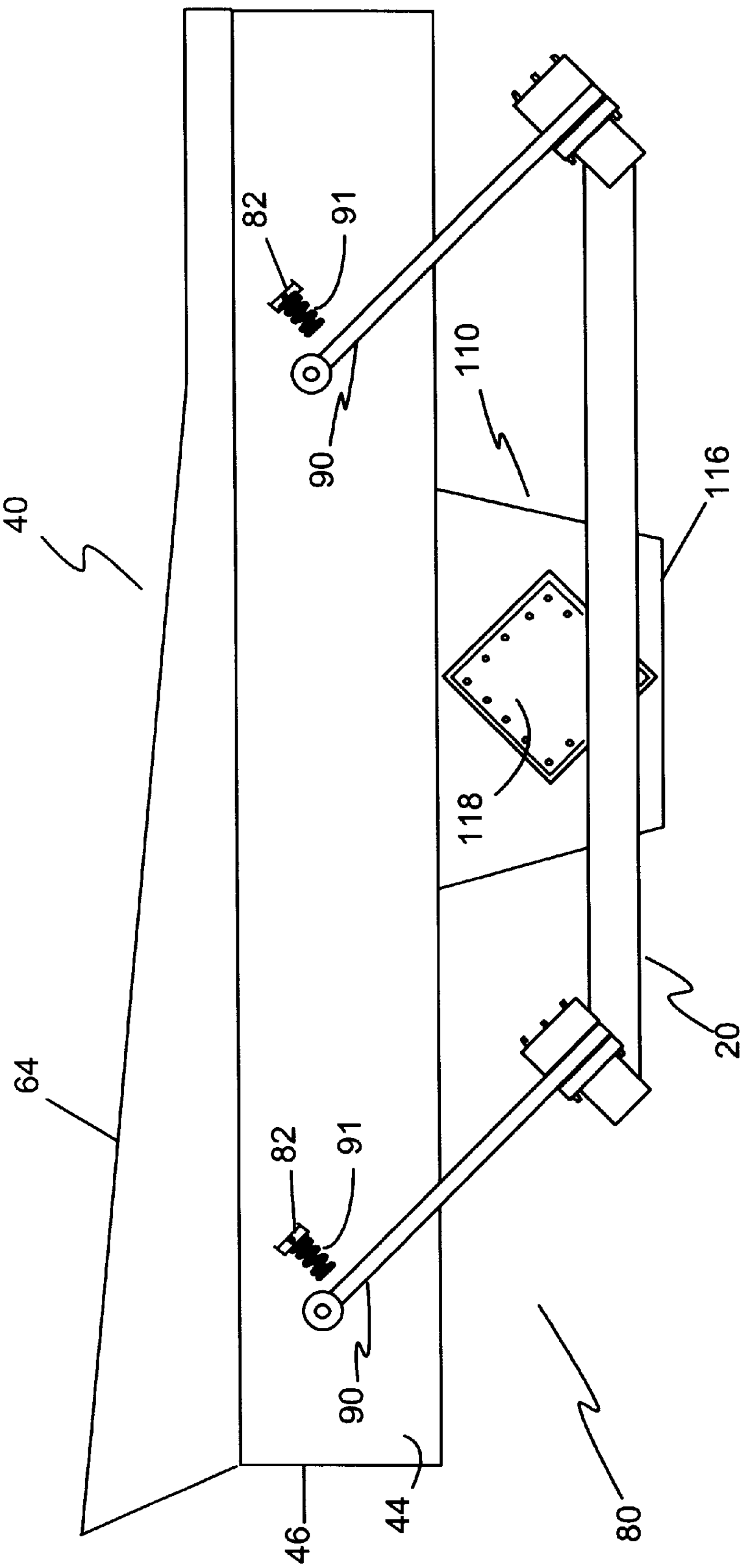
FIG. 4B is a side view of the present invention showing a third embodiment of the spring assemblies attached to the support frame and the screen deck.

FIG. 4A shows a side view of screener 10 where a second embodiment of the spring assemblies 80 is employed. In this embodiment, spring component 90 is a coil spring. FIG. 4B shows a side view of screener 10 where a third embodiment of the spring assemblies 80 is used. In this embodiment, spring component 90 uses a combination of leaf springs and coils springs. A coil spring 91 connected to the spring stop 82 is used in place of the second leaf spring shown in FIG. 4 to provide the biasing action provided by the second leaf spring.

In another embodiment (not shown), hopper 64 may be removable by attaching hopper 64 to support frame 20 using hopper retainer legs that attach to connecting sides 23. A disadvantage of a detachable hopper is that it is prone to material buildup during raw material loading because it is not attached to screen deck 40 and, thus, it is not subject to the direct agitation of screen deck 40. An advantage of using a detachable hopper is that additional screen decks may be attached in a stacking manner to screener 10. This allows: the use of different mesh sizes for separating the raw material by particle size.

Figure 5:
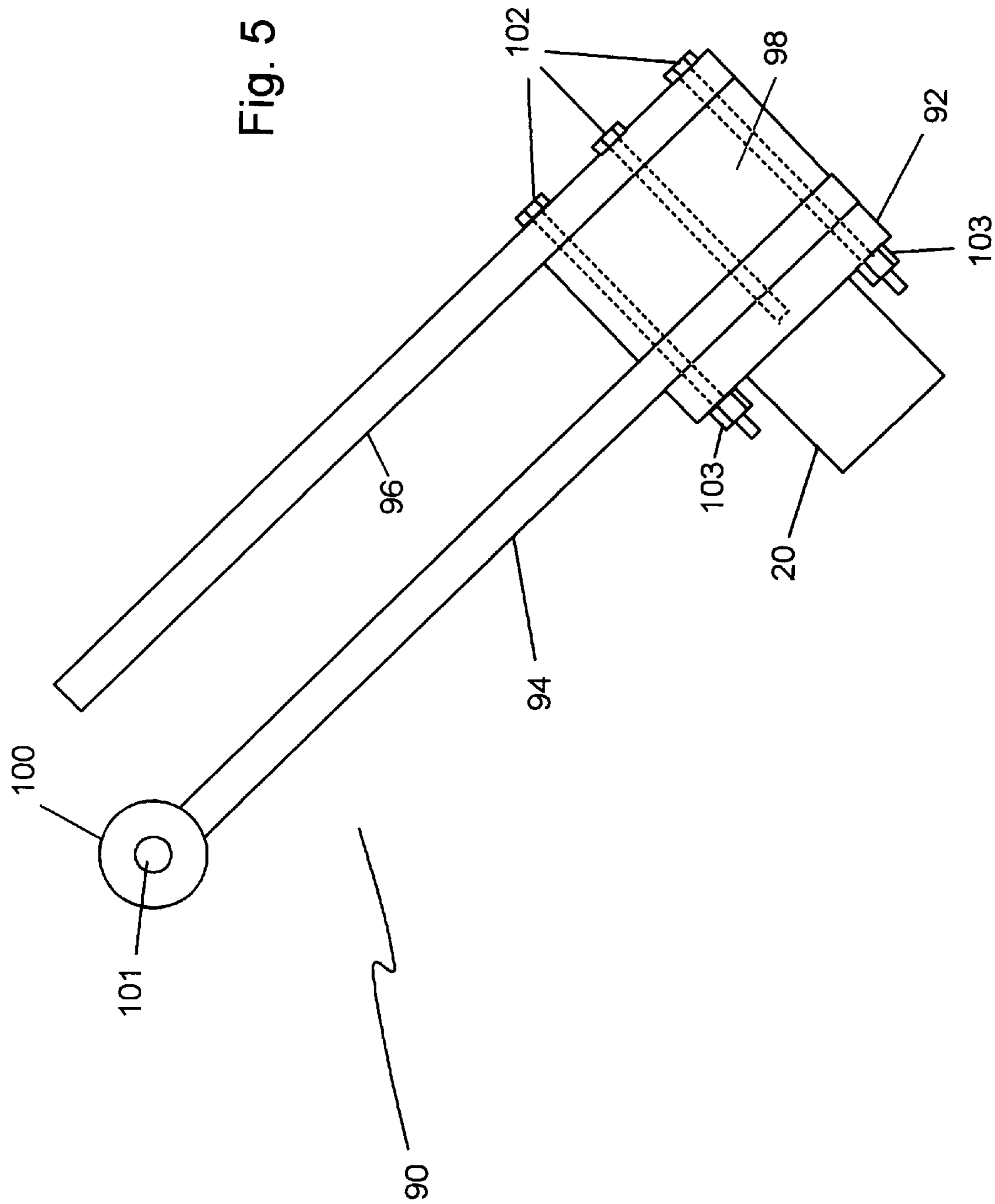
FIG. 5 is an enlarged view of a spring assembly of the present invention.

FIG. 5 shows a side view of a single spring component 90 used in screener 10. Spring component 90 has a lower spring mount plate 92, a single leaf spring 94, a counter spring 96, a spacer 98 that separates single leaf spring 94 from counter spring 96 on one end, and a deck spring mount 100. Spring component 90 is bolted to the screen deck 40 through the deck spring mount 100. The deck spring mount 100 is positioned at the end of the single leaf spring 94. A screen deck bolt 101 bolts the spring component 90 through the deck spring mount 100 to the screen deck 40.

Spring component bolts 102 attach the spring component 90 to the support frame 20. A spring mounting plate 92 is welded to extending end 21 of the support frame 20 and provides the site for bolting the spring component 90 to the support frame 20. The screen frame bolts 102 attach the spring component 90 to the lower mounting plate 92. The spring component bolts 102 extend through the counter spring 96, the spacer 98, the single leaf spring 94 and into the spring mounting plate 92. The two outside spring component bolts 102 secure the spring component 90 with retaining nuts 103 while the middle spring component bolt 102 is secured by a threaded hole in spring mounting plate 92. Single leaf spring 94 and counter spring 96 are preferably made of three-inch wide flat steel stock. Each counter spring 96 is 3" wide×24" long×0.25" thick. Each single leaf spring 94 is 3" longer that counter spring 96 to provide a 3" diameter wrap around forming deck spring mount 100.

Figure 6:
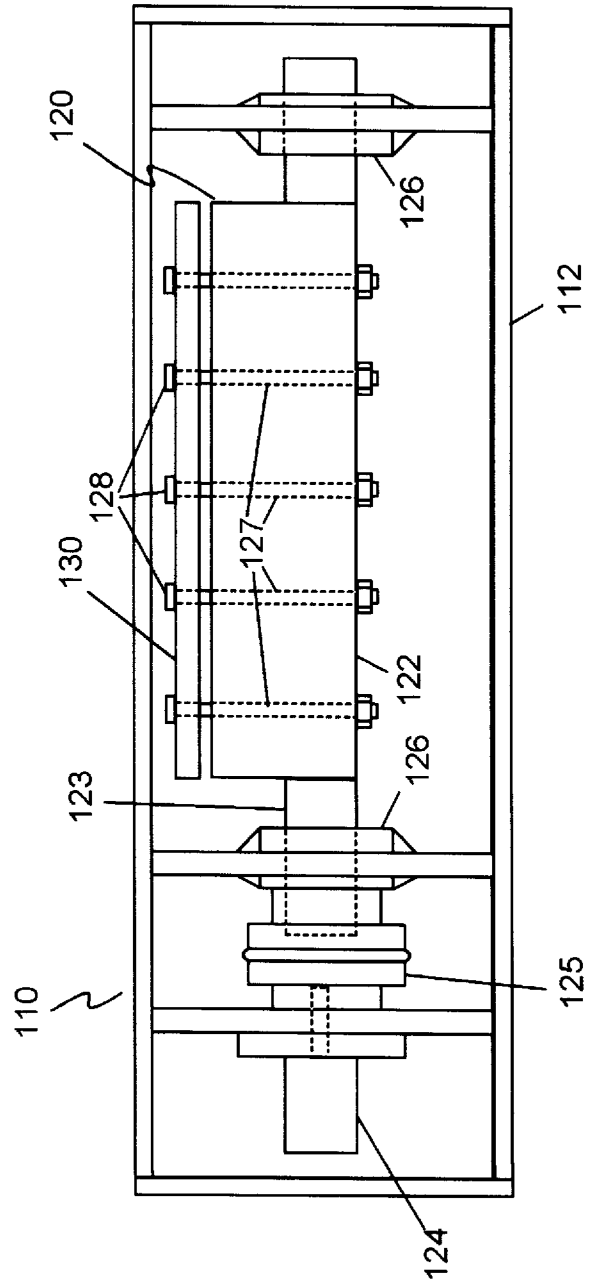
FIG. 6 is a cross-sectional view of the vibratory mechanism of the present invention showing the drive motor, the coupler, the weighted shaft and the bearings.

FIG. 6 shows a cross-sectional view of vibratory mechanism 110. Vibratory mechanism 110 includes an elongated housing 112 that encloses a drive motor 124 coupled to a vibratory shaft mechanism 120 that is supported by bearings 126. Vibratory shaft mechanism 120 includes a shaft 122, a weight plate 130 and weight bolts 128. Shaft 122 is constructed from a steel bar with a square cross section. Preferably, shaft 122 is a 4"×4" inch square bar. An offset weight is created by milling the shaft ends 123 to a circular cross-section offset from the centerline of shaft 122. Throughout shaft 122, there is a plurality of bolt passages 127 for bolting weight plate 130 to shaft 122. Depending on the size of the screener 10 and the amount and weight of raw material to be screened, the use of weight plate 130 may not be required as the purpose of weight plate 130 is to provide a larger offset weight to vibratory shaft mechanism 120. Another embodiment is identical to the shaft mentioned above with the exception that the ends are milled in line with the center axis of shaft 122. In this embodiment, the only offset weight is the weight plate 130 bolted to shaft 122. Any shaft that provides an offset weight when rotated causes the elliptical motion that produces the vibratory/agitation motion.

A motor 124 for providing a driving source is attached to shaft end 123 of the vibratory shaft mechanism 120. In the present invention, a Sundstrand Model No. YAM22/900-75-c107 bi-directional, hydraulic gear-motor was employed. In another embodiment (not shown), a centrally mounted single motor driving two vibratory shafts is used. In yet another embodiment, two synchronized motors, each motor connected at opposite ends of the shaft, are employed to drive the vibratory shaft. It should also be understood that a counter-weight flywheel might also be used in conjunction with a circular shaft to provide the vibratory motion.

Figure 7:
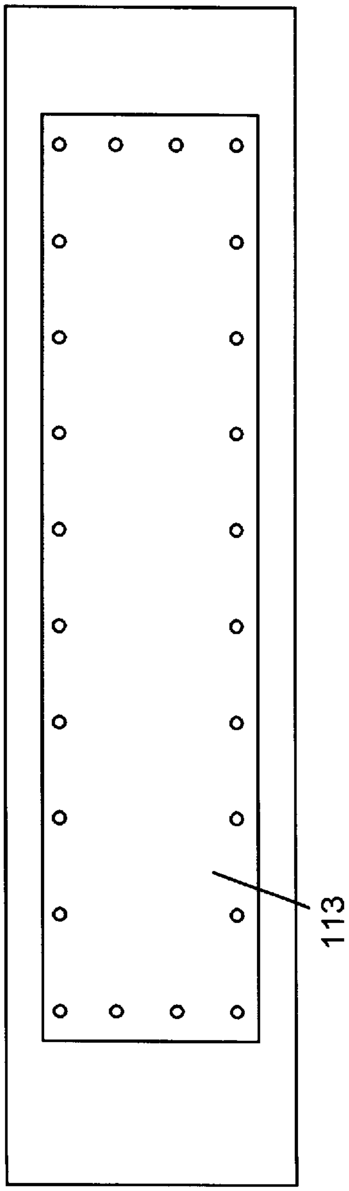
FIG. 7 is a bottom angle view of the housing of the vibratory mechanism showing the access cover.
Figure 8:
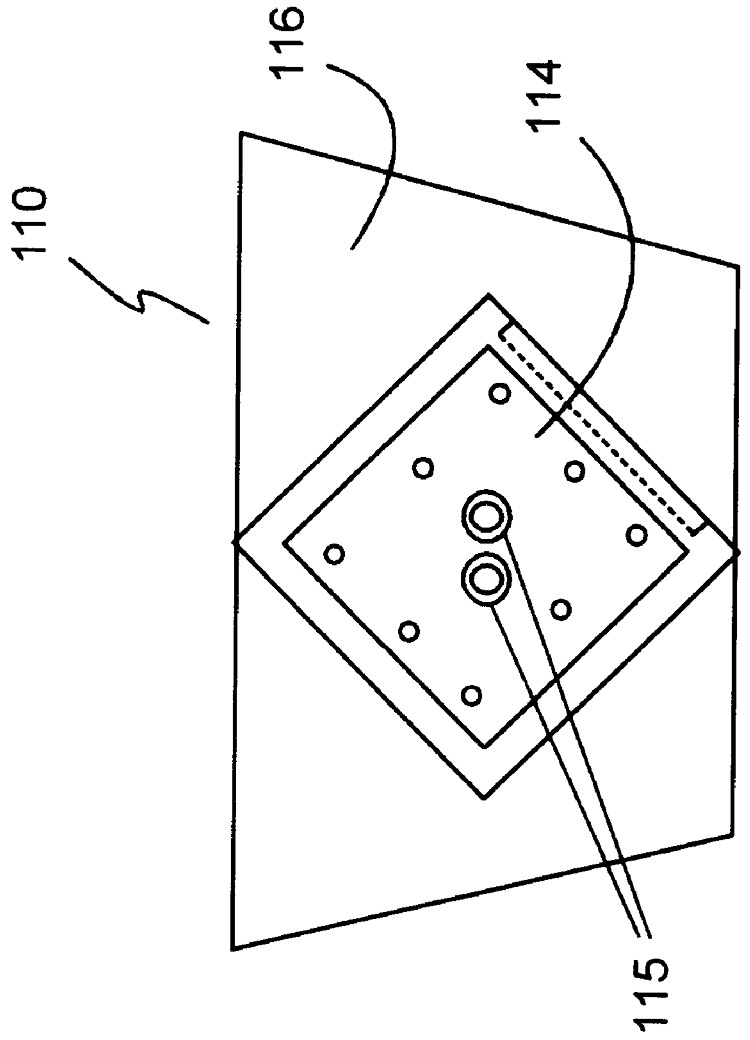
FIG. 8 is an end view of the vibratory mechanism of the present invention showing the connecting plate service cover and the hydraulic fittings.

The vibratory shaft mechanism 120 and motor 124 are connected to and contained in a protective, elongated housing 112. A set of bearings 126 fitted to the milled shaft ends 123 conveys the vibratory motion to the housing 112 produced by the rotation of vibratory shaft mechanism 120. The enclosed housing 112 is attached to screen deck 40 by connecting plates 116 located at each end of enclosed housing 112. Thus, the vibratory motion is transmitted to the screen deck 40. In one embodiment, housing 112 is attached by welding the connecting plate 116 to the screen deck 40. In another embodiment, the connecting plate 116 is bolted to the screen deck 40. The advantage of bolting the housing 112 to the screen deck 40 is that the vibratory mechanism 110 can be removed from deck 40 for facilitated replacement or repair and then easily re-attached. Elongated housing 112 includes a service door 113, as shown in FIG. 7, for servicing all of the components of vibratory mechanism 110. As shown in FIG. 8, there may also be provided a connecting plate service door 114 at one or both connecting plates 116 to provide further access to the components of vibratory mechanism 110. Connecting plate service door 114 located on the end where motor 124 is located has hydraulic hose connections 115 for convenient attachment of hydraulic fluid lines to power hydraulic motor 124.

To mount the present invention onto a vehicle body 12, a person would attach the screener specific sideboards 11 securely to dump body 12. Next, the operator would communicably insert the extending ends 21 of the support frame 20 screener 10 into the compatible receiving brackets of sideboards 11 previously mounted on the dump body 12. The screener 10 is then tied down and secured to the dump body 12 using chains and the like. This prevents screener 10 from being displaced when transported or operated.

To use the present invention while mounted on dump body 12, the user can power the screener by using the vehicles hydraulic power source after the user connects hydraulic hoses from the hydraulic hose connections 115 shown in FIG. 8 to a hydraulic switching valve (not shown) connected to the dump truck's hydraulic system for operating the dump body 12. The operator then adds the raw material onto the vibratory screen deck 40 by using a frontloader or other means to move the raw material. The screener 10 deposits the screened product into the dump body 12 of the vehicle. It should be understood by those skilled in the art that the screener 10 may be powered electrically provided that an electric motor is used in place of the hydraulic motor 124 of the preferred embodiment.

If the operator desires to operate the screener 10 independently from the dump truck, the user may support the screener 10 using a screener support structure or legs and connecting the screener 10 to an independent power source, whether it is electrical or hydraulic. In the case of the preferred embodiment, the hydraulic hoses are attached to an independent hydraulic pump system after independently supporting screener 10. The support legs may be constructed such that a dump truck could pass underneath screener 10 to receive screened material into the dump body.

Although the preferred embodiments of the present invention have been described herein the above description is merely illustrative. Further modification of the invention herein disclosed will occur to those skilled in the respective arts and all such modifications are deemed to be within the scope of the invention as defined by the appended claims.

What is claimed is:

1. A dump truck mountable particle screener comprising:

a support frame having support members for mounting over the dump body of a dump truck;

a plurality of spring assemblies each having a first end and a second end, each of said plurality of spring assemblies includes a first leaf spring, a second leaf spring, a spacer between said first leaf spring and said second leaf spring, and connecting members connecting said first leaf spring, said second leaf spring and said spacer together forming said first end, said first end connected to one of said support members, wherein said second end includes the opposite ends of said first leaf spring and said second leaf spring spaced and free from each other, wherein said opposite end of said first leaf spring has a screen deck mounting component;

a screen deck supported above said support frame by said plurality of spring assemblies wherein said second end of each of said plurality of spring assemblies is connected to said screen deck by way of said screen deck mounting component; and a vibratory mechanism connected to the bottom of said screen deck.

2. The particle screener of claim 1 wherein said support frame has a pair of opposed supporting sides and a pair of opposed connecting sides forming a rectangular shape with extending ends wherein said extending ends are extensions of said supporting sides, said extending ends being said support members.

3. The particle screener of claim 2 wherein said plurality of spring assemblies further includes a spring mounting plate fixedly attached to said supporting sides of said support frame for connecting said spring assemblies to said support frame.

4. The particle screener of claim 1 wherein said plurality of spring assemblies further includes a second leaf spring stop mounted on said vibratory deck and positioned such that a portion of said second leaf spring end opposite said spacer end is spaced from said spring stop but periodically contacts said second leaf when said particle screener is operated.

5. The particle screener of claim 1 wherein said vibratory mechanism includes a drive motor, a rotatable counterweight shaft connected to said drive motor wherein a major length of said counterweight shaft provides the counterweight for producing vibratory action, shaft bearings to rotatably support said shaft, and a housing to contain said drive motor, said rotatable shaft and said shaft bearings.

6. The particle screener of claim 5 wherein said major length of said counterweight shaft includes a counterweight removably attached to said shaft.

7. The particle screener of claim 5 wherein said shaft has a square or rectangular cross-section along a major length of the shaft and two coaxial ends configured to be received by said shaft bearings wherein said shaft is rotatable about the center axis of said two coaxial ends.

8. The particle screener of claim 5 wherein said shaft has two coaxial ends offset from the center axis of the major portion of said shaft.

9. The particle screener of claim 1 wherein said screen deck includes a deck frame having side rails and end rails, a plurality of cross braces between a lower portion of said side rails, a plurality of screen supports between said end rails and above said plurality of cross braces wherein said plurality of screen supports diminish in height from the longitudinal center line of said deck frame to the side rails, at least one screen supported by said plurality of screen supports, and screen retainer rails connected to said side rails and configured to secure the side rail edges of said at least one screen.

10. A dump truck mountable screener comprising:

a support frame having support members for mounting over the dump body of a dump truck;

a plurality of spring assemblies having a first end and a second end, said first end connected to said support members;

a screen deck supported above said support frame by said plurality of spring assemblies wherein said second end of each of said plurality of spring assemblies is connected to said screen deck; and a vibratory mechanism connected to the bottom of said screen deck wherein said vibratory mechanism includes a drive motor, a rotatable counterweight shaft connected to said drive motor wherein a major length of said shaft is the counterweight that provides vibratory action, and shaft bearings to rotatably support said shaft.

11. The particle screener of claim 10 wherein said plurality of spring assemblies are leaf springs.

12. The particle screener of claim 10 wherein said plurality of spring assemblies are coil springs.

13. The particle screener of claim 10 wherein said plurality of spring assemblies are a combination of leaf springs and coil springs.

14. The particle screener of claim 10 wherein each of said plurality of spring assemblies includes a first leaf spring, a second leaf spring, a spacer between said first leaf spring and said second leaf spring, and connecting members connecting said first leaf spring, said second leaf spring and said spacer together forming said first end, said first end connected to one of said support members, wherein said second end includes the opposite ends of said first leaf spring and said second leaf spring spaced and free from each other, wherein said opposite end of said first leaf spring has a screen deck mounting component.

15. The particle screener of claim 10 wherein said screen deck includes a deck frame having side rails and end rails, a plurality of cross braces between a lower portion of said side rails, a plurality of screen supports between said end rails and above said plurality of cross braces wherein said plurality of screen supports diminish in height from the longitudinal center line of said deck frame to the side rails, at least one screen supported by said plurality of screen supports, and screen retainer rails connected to said side rails and configured to secure the side rail edges of said at least one screen.

* * * * *